(12) United States Patent
Lah et al.

(10) Patent No.: US 8,085,469 B2
(45) Date of Patent: Dec. 27, 2011

(54) OPTICAL FILM

(76) Inventors: WooJoo Lah, Seoul (KR); Yongsig Shim, Seoul (KR)

( * ) Notice: Subject to any disclaimer, the term of this patent is extended or adjusted under 35 U.S.C. 154(b) by 412 days.

(21) Appl. No.: 11/492,976

(22) Filed: Jul. 26, 2006

(65) Prior Publication Data
US 2006/0262667 A1   Nov. 23, 2006

(51) Int. Cl.
*G02B 27/10* (2006.01)
(52) U.S. Cl. ........................................................ 359/626
(58) Field of Classification Search .................. 359/626, 359/707
See application file for complete search history.

(56) References Cited

U.S. PATENT DOCUMENTS

| | | | | |
|---|---|---|---|---|
| 5,081,545 A * | 1/1992 | Sugawara et al. | ............ | 359/625 |
| 5,696,630 A * | 12/1997 | Hayashi | ........................ | 359/599 |
| 6,130,777 A * | 10/2000 | Yamashita et al. | ............ | 359/456 |
| 6,178,035 B1 * | 1/2001 | Eda et al. | ........................ | 359/326 |
| 6,325,880 B1 * | 12/2001 | Yamashita et al. | ............ | 156/209 |
| 6,900,941 B2 * | 5/2005 | Kaminsky et al. | ............ | 359/599 |
| 2003/0169499 A1 * | 9/2003 | Bourdelais et al. | ........... | 359/599 |
| 2003/0169504 A1 * | 9/2003 | Kaminsky et al. | ............ | 359/622 |
| 2003/0169512 A1 * | 9/2003 | Bourdelais et al. | ........... | 359/707 |
| 2003/0169513 A1 * | 9/2003 | Kaminsky et al. | ............ | 359/707 |
| 2003/0169514 A1 * | 9/2003 | Bourdelais et al. | ........... | 359/707 |

* cited by examiner

*Primary Examiner* — James Greece

(57) ABSTRACT

An optical film includes a first refraction layer having a first surface with first optical lens patterns for scattering light and a second surface opposite to the first surface, the first optical lens patterns having a lens shape, and a second refraction layer on the first surface and having second optical patterns for redirecting light in a first direction that is perpendicular to the second surface of the first refraction layer, the second optical patterns being linearly arranged.

16 Claims, 7 Drawing Sheets

OPTICAL FILM

The present invention claims the benefit of International Patent Application No. PCT/KR2004/001922 filed in Korea on Jul. 30, 2004 and Korean Patent Application No. 10-2004-0040876 filed in Korea on Jun. 4, 2004, which are hereby incorporated by reference in its entirety.

BACKGROUND OF THE INVENTION

1. Field of the Invention the present invention relates to an optical film, and more particularly, to an optical film for collecting and refracting light.

Figure 12:
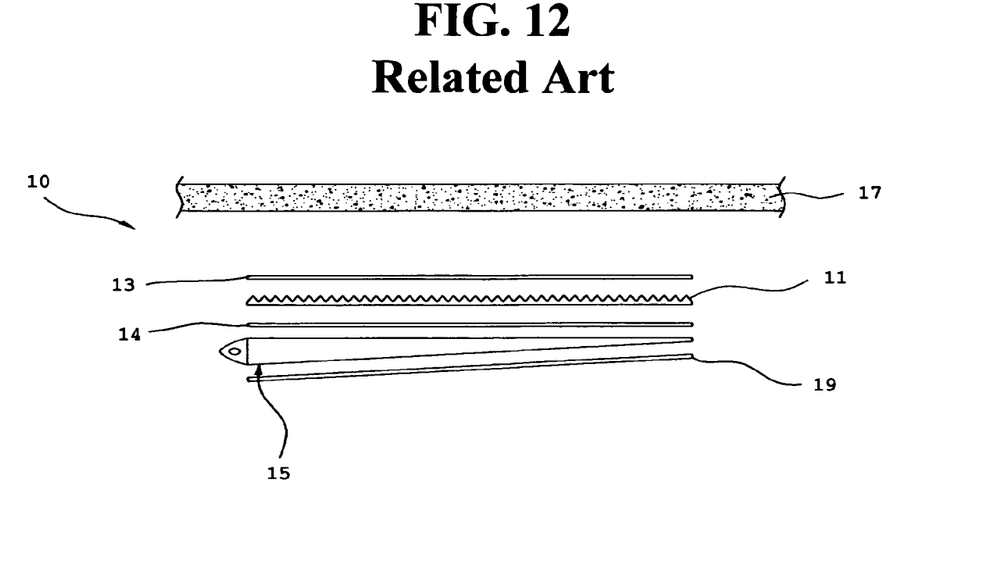
FIG. 12 is an expanded side view of a relate art backlight unit in which an optical film is installed.

2. Discussion of the Related Art in general, a backlight unit provides light to a display device. FIG. 12 is a side view of a related art backlight unit in which an optical film is installed. As shown in FIG. 12, a backlight unit 10 uses a light source 15 to provide light to the display panel 17 of a display device, such as a thin film transistor liquid crystal display (TFT-LCD). The backlight unit 10 shown in FIG. 12 also includes an optical film 11 for collecting and refracting light emitted from the light source 15 so as to cause the refracted light to be incident upon the display panel 17. Furthermore, the backlight unit 10 can include a reflector 19 below the light source 15 as well as other adjacent optical films 13 and 14 above and below the optical film 11.

Figure 13:
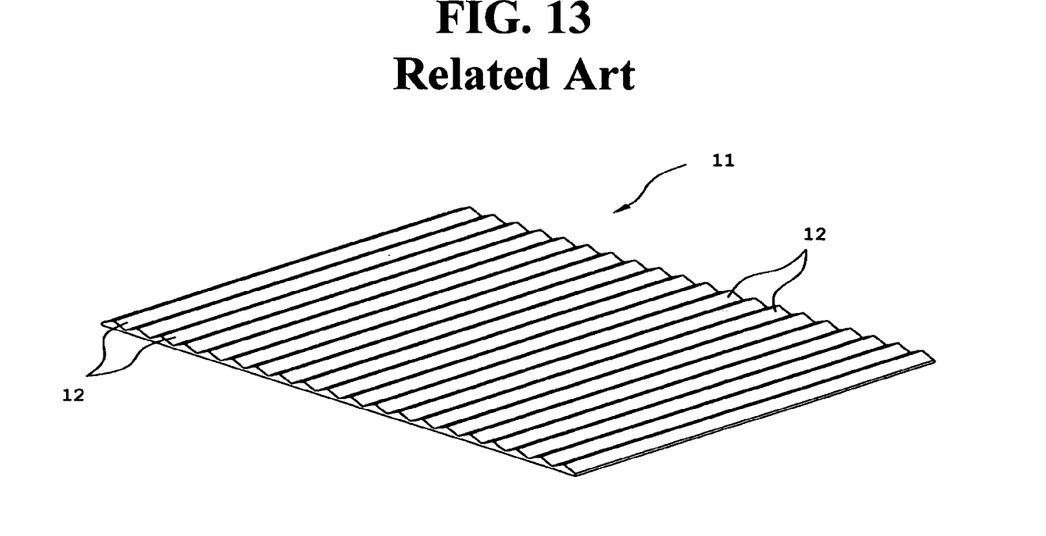
FIG. 13 is a perspective view of the related art optical film.

FIG. 13 is a perspective view of the related art optical film. The related art optical film 11 has a surface with a plurality of linear prism patterns 12 each having a triangular cross-section and positioned adjacent to each other. Since such a related art optical film 11 having the linear prism patterns 11, there is a limitation as to the directions from which light can be collected and refracted. Because of this limitation, there is a disadvantage in that the brightness of the display panel 17 is significantly lowered as a viewing angle of the display panel 17 increases.

Figure 14:
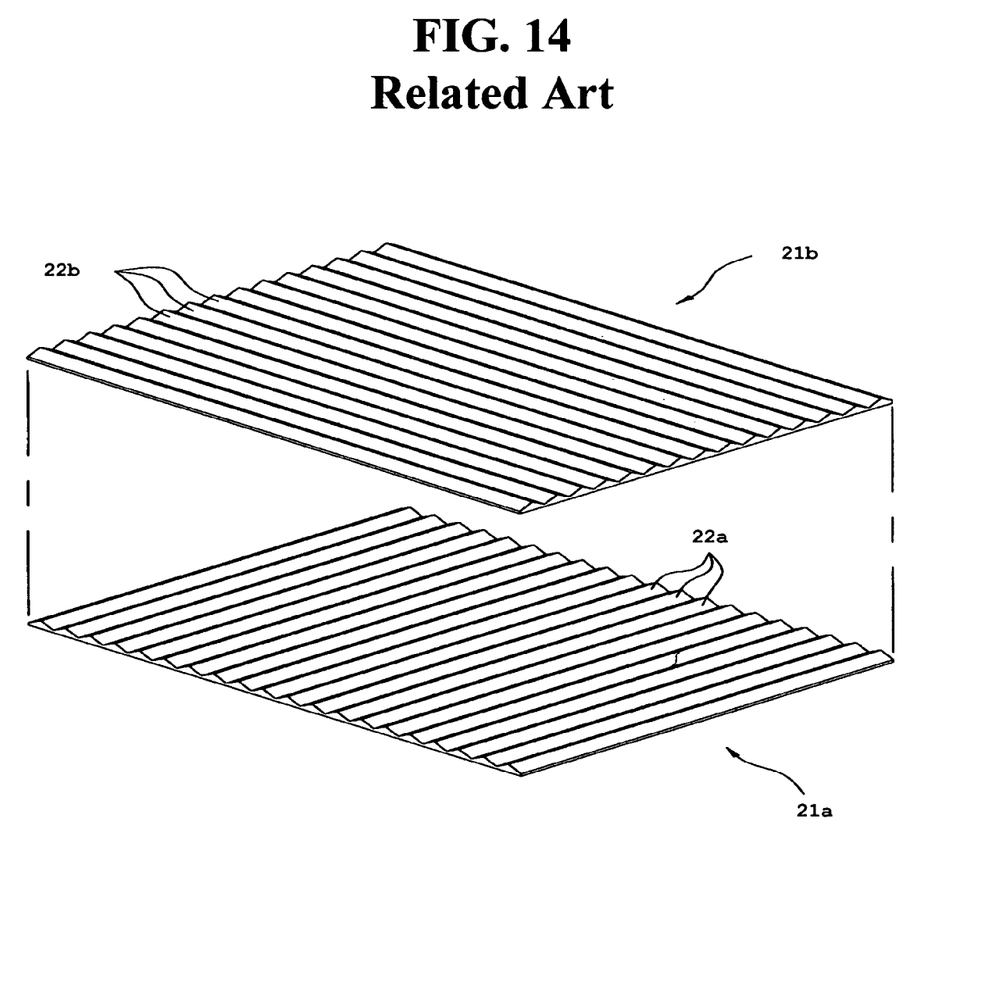
FIG. 14 is a perspective view of a pair of related art optical films.

FIG. 14 is a perspective view of a pair of related art optical films. To overcome the disadvantage of brightness decreasing as the viewing angle increases, a technique has been developed in which two sheets of optical films 21a and 21b having linear prism patterns with triangular cross sections 22a and 22b are positioned such that their prism patterns 22a and 22b perpendicularly cross each other, as shown in FIG. 14. Because the linearly arranged prism patterns 2a and 22b cross each other, the directions from which light is collected and refracted are increased. Accordingly, a decrease in brightness as the viewing angle of the display panel 17 increases is significantly reduced.

Although the directions in which light is collected and refracted is increase, there still is a limitation on the light-refracting direction due to the structure of the triangular prism patterns 22a and 22b. Thus, there is a problem in that overall brightness does not increase and may decrease overall brightness. The linearly arranged prism patterns 22a and 22b crossing each other cause a wet-out phenomenon due to optical coupling of uppermost tips of the prism patterns 22a of the lower optical film 21a with the upper optical film 21b and by the lower optical film 21a with another adjacent film. This causes a problem in that moire is produced in an image displayed on the display panel 17.

Moreover, there is no light scattering in the related art in which the two sheets of optical films 21 and 21b are positioned such that their linearly arrange prism patterns 22a and 22b cross each other due to the limited amount of light-refracting direction. Thus, there is a disadvantage in that if a mote or scratch is occurs between the optical films 21a and 21b during a manufacturing process, such a defect will be readily apparent. Accordingly, there is a problem in that productivity can lowered due to increased defects and working difficulty.

SUMMARY OF THE INVENTION

Accordingly, the present invention is directed to an optical film that substantially obviates one or more of the problems due to limitations and disadvantages of the related art.

An object of the present invention is to provide an optical film capable of exhibiting high brightness within a wide viewing angle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical film includes a first refraction layer having a first surface with first optical lens patterns for scattering light and a second surface opposite to the first surface, the first optical lens patterns having a lens shape, and a second refraction layer on the first surface and having second optical patterns for redirecting light in a first direction that is perpendicular to the second surface of the first refraction layer, the second optical patterns being linearly arranged.

In another aspect, a method of manufacturing an optical film includes forming a first refraction layer having a first surface with first optical lens patterns for scattering light and a second surface opposite to the first surface, the first optical lens patterns having a lens shape, and forming a second refraction layer on the first surface and having second optical patterns for redirecting light in a first direction that is perpendicular to the second surface of the first refraction layer, the second optical patterns being linearly arranged.

In another aspect, a display device includes a display panel for displaying an image having a light receiving surface, a light source for providing light to the display panel, and an optical film positioned between the light source and the display panel, the optical film includes a first refraction layer adjacent to the light source and having first optical lens patterns for scattering light, the first optical lens patterns having a lens shape, and a second refraction layer on the first surface and having second optical patterns for redirecting light in a first direction that is perpendicular to the light receiving surface of the display panel, the second optical patterns being linearly arranged.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. It should be noted that for the sake of convenience of description, optical films shown in the drawings are not to scale.

Figure 1:
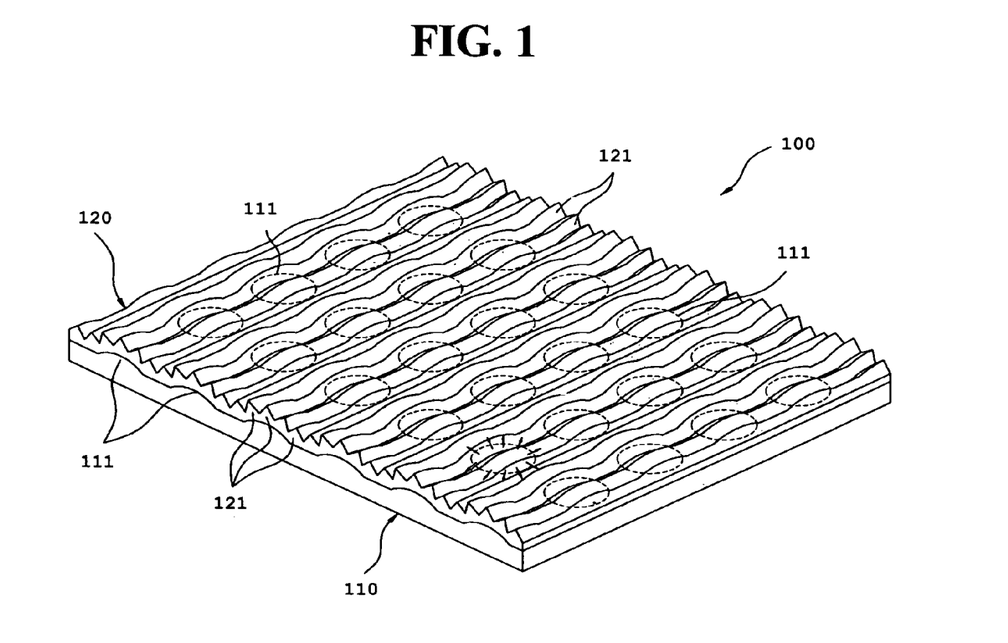
FIG. 1 is a perspective view of an optical film according to a first embodiment of the present invention.
Figure 2:
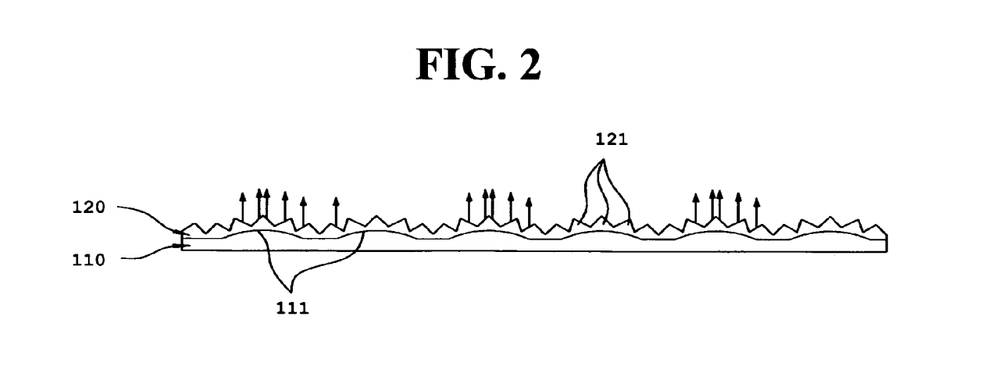
FIG. 2 is a cross-sectional view of the optical film shown in FIG. 1.

FIG. 1 is a perspective view of an optical film according to a first embodiment of the present invention, and FIG. 2 is a cross-sectional view of the optical film shown in FIG. 1. As shown in FIGS. 1 and 2, the optical film 100 of the first embodiment includes a first refraction layer 110 having a plurality of first optical lens patterns 111 for collecting and scattering light, which has been emitted from a light source and a second refraction layer 120 with a plurality of second optical patterns 121 for collecting the light scattered by the first refraction layer 110 and redirecting the collected light vertically to a display panel. As shown in FIG. 1, each of the first optical lens patterns 111 of the first refraction layer 110 is a convex lens with a circular shape when viewed in a plan view and is distributed at a predetermined interval as embossments.

As shown in FIG. 2, each of the first optical lens patterns 111 has convex lens shape that protrudes upwardly when viewed in cross-section. The first optical lens patterns 111 control light delivered from a light source under the rear surface of the first refraction layer 110 by collecting the light from the rear surface of the first refraction layer 110 and scattering the light in all directions throughout a wide angle to the second refraction layer 120. Then, the scattered light is redirected to a substantially vertical direction, which is perpendicular to the rear surface of the first refraction layer 110 or to the rear surface of the display panel, by the second optical patterns 121 of the second refraction layer 120. The collection and scattering of the light by the first optical lens patterns 111 can be controlled by adjusting the shape, size, type of lens, lens arc and interval spacing of the first optical lens patterns 111 during manufacture of the optical film 100.

Each of the second optical patterns 121 of the second refraction layer 120 has a plurality of linear triangular cross-sectional shapes having different inclinations with respect to each other as a result of following the contour of the first refraction layer 110 with the first optical lens patterns 111. The second optical patterns 121 are formed over the first optical lens patterns 111 such that the upper surface of the first refraction layer 110 is in contact with the rear surface of the second refraction layer 120. Accordingly, the second optical patterns 121 positioned above the first optical lens patterns 111 generally form a corrugated shape with peaks and valleys corresponding to the pattern surfaces of the first optical lens patterns 111. The different heights and different inclinations of the triangular cross-sectional shapes of the second optical patterns 121 deliver light, which has been collected and scattered by the first optical lens patterns 111, to a display panel (not shown) through nearly vertical refraction while minimizing the wet-out phenomenon observable with the naked eye by minimizing optical coupling with other adjacent films. Thus the placement of the second optical patterns 121 over the first optical lens patterns 111, as shown in FIG. 2, enables the light scattered by the first optical lens patterns 111 to be effectively collected and redirected for transmission perpendicularly toward a light receiving surface of a display panel (not shown).

The first and second refraction layers 110 and 120 can each be formed as a single layer by using any one of polycarbonate, polyvinylchloride, polypropylene, polyethylene and acrylic polymers, which are light-transmitting materials through which light in the visible range can be smoothly transmitted. Alternatively, the first and second refraction layers 110 and 120 can be manufactured to have a multi-layered structure that is separately formed out of either identical materials or different respective materials among the aforementioned materials and then coupling the layers so as to be in contact with each other.

Figure 3:
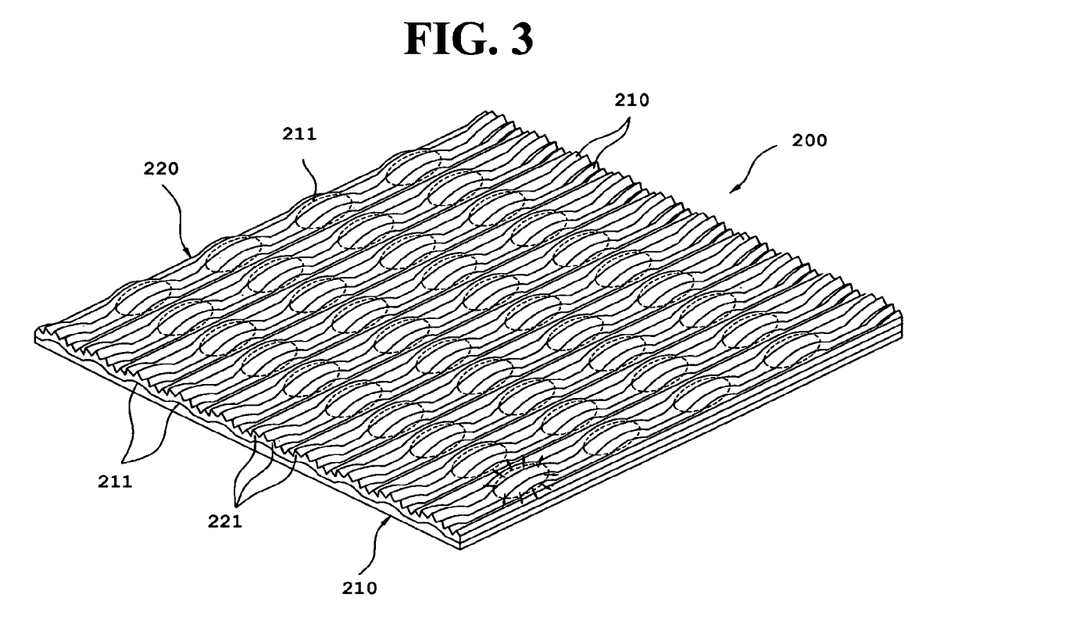
FIG. 3 is a perspective view of an optical film according to a second embodiment of the present invention.

FIG. 3 is a perspective view of an optical film according to a second embodiment of the present invention. As shown in FIG. 3 the optical film 200 of the second embodiment includes a first refraction layer 210 having a plurality of first optical lens patterns 211 for collecting and scattering light, which has been emitted from a light source and a second refraction layer 220 with a plurality of second optical patterns 221 for collecting the light scattered by the first refraction layer 210 and redirecting the collected light vertically to a display panel. As shown in FIG. 3, each of the first optical lens patterns 211 of the first refraction layer 210 is convex lens with an elliptical shape when viewed in a plan view and is distributed at a predetermined interval as embossments.

Figure 4:
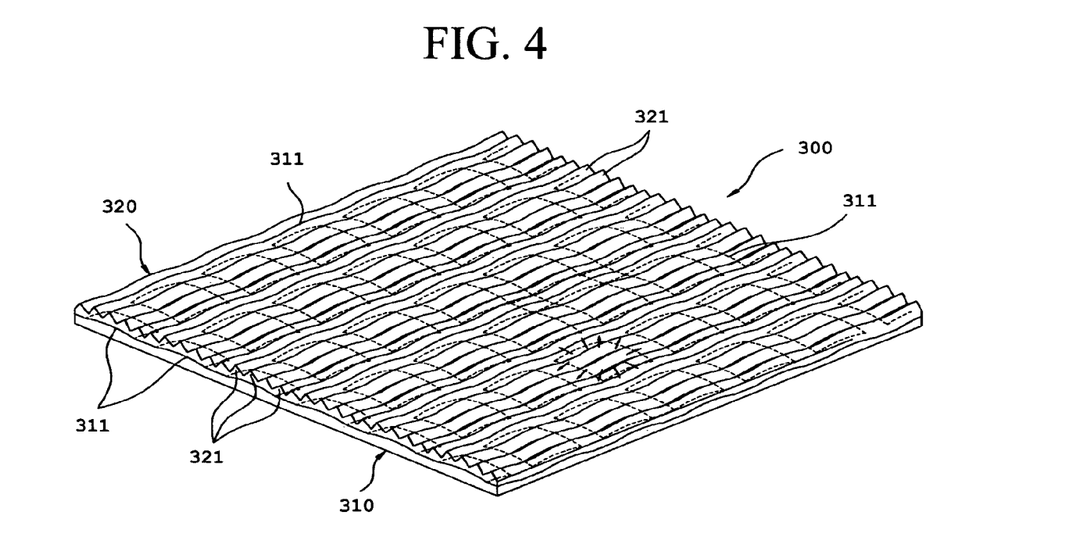
FIG. 4 is a perspective view of an optical film according to a third embodiment of the present invention.

FIG. 4 is a perspective view of an optical film according to a third embodiment of the present invention. As shown in FIG. 4 the optical film 300 of the third embodiment includes a first refraction layer 310 having a plurality of first optical lens patterns 311 for collecting and scattering light, which has been emitted from a light source and a second refraction layer 320 with a plurality of second optical patterns 321 for collecting the light scattered by the first refraction layer 310 and redirecting the collected light vertically to a display panel. As shown in FIG. 4, each of the first optical lens patterns 311 of the first refraction layer 310 is a convex lens with a polygonal shape when viewed in a plan view and is distributed at a predetermined interval as embossments.

Figure 5:
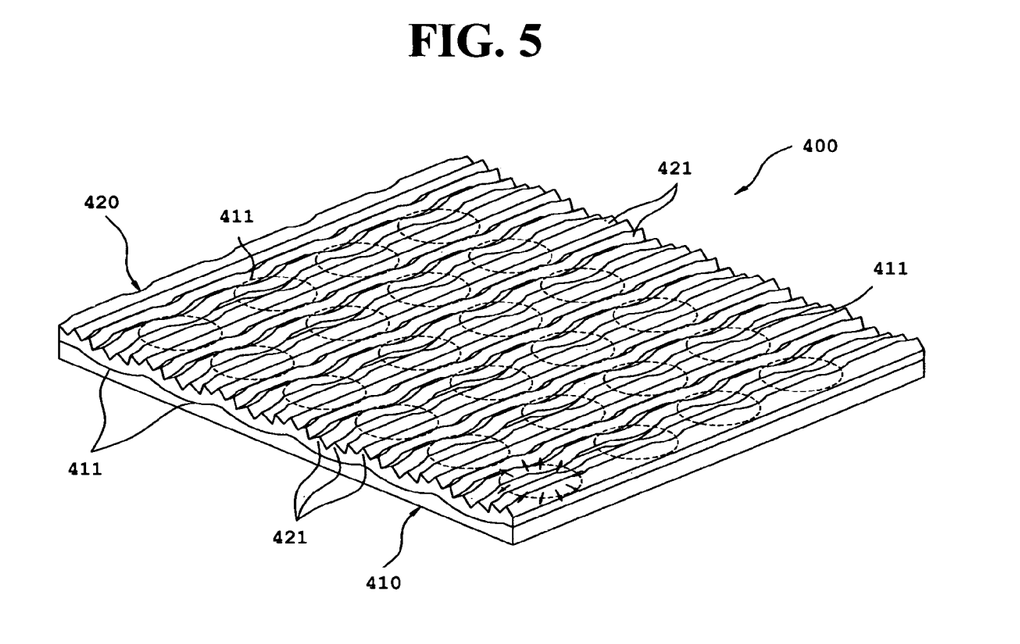
FIG. 5 is a perspective view of an optical film according to a fourth embodiment of the present invention.
Figure 6:
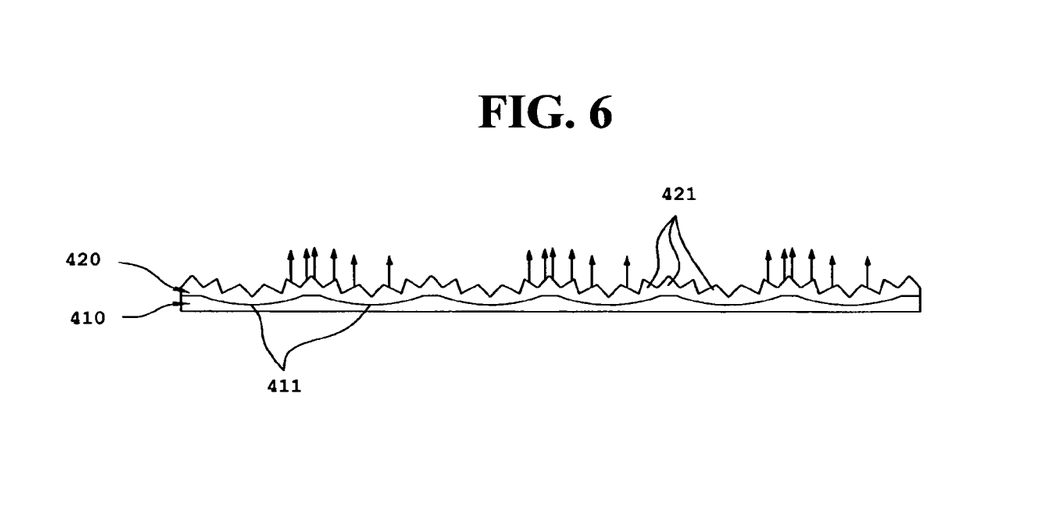
FIG. 6 is a cross-sectional view of the optical film shown in FIG. 5.

FIG. 5 is a perspective view of an optical film according to a fourth embodiment of the present invention. FIG. 6 is a cross-sectional view of the optical film shown in FIG. 5. As shown in FIG. 5 the optical film 400 of the fourth embodiment includes a first refraction layer 410 having a plurality of first optical lens patterns 411 for collecting and scattering light, which has been emitted from a light source and a second refraction layer 420 with a plurality of second optical patterns 421 for collecting the light scattered by the first refraction layer 410 and redirecting the collected light vertically to a display panel. As shown in FIGS. 5 and 6, each of the first optical lens patterns 411 of the first refraction layer 410 has a concave lens with a circular shape when viewed in a plan view and is distributed at a predetermined interval as embossments.

Figure 7:
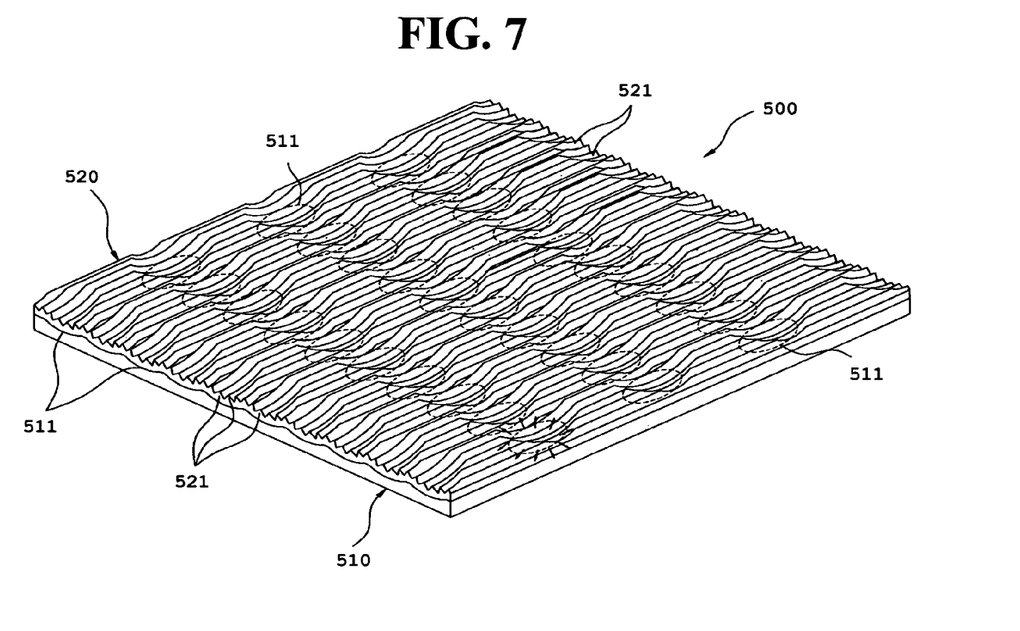
FIG. 7 is a perspective view of an optical film according to a fifth embodiment of the present invention.

FIG. 7 is a perspective view of an optical film according to a fifth embodiment of the present invention. As shown in FIG. 7 the optical film 500 of the fifth embodiment includes a first refraction layer 510 having a plurality of first optical lens patterns 511 for collecting and scattering light, which has been emitted from a light source and a second refraction layer 520 with a plurality of second optical patterns 521 for collecting the light scattered by the first refraction layer 510 and redirecting the collected light vertically to a display panel. As shown in FIG. 7, each of the first optical lens patterns 511 of the first refraction layer 510 has a concave lens with an elliptical shape when viewed in a plan view and is distributed at a predetermined interval as embossments.

Figure 8:
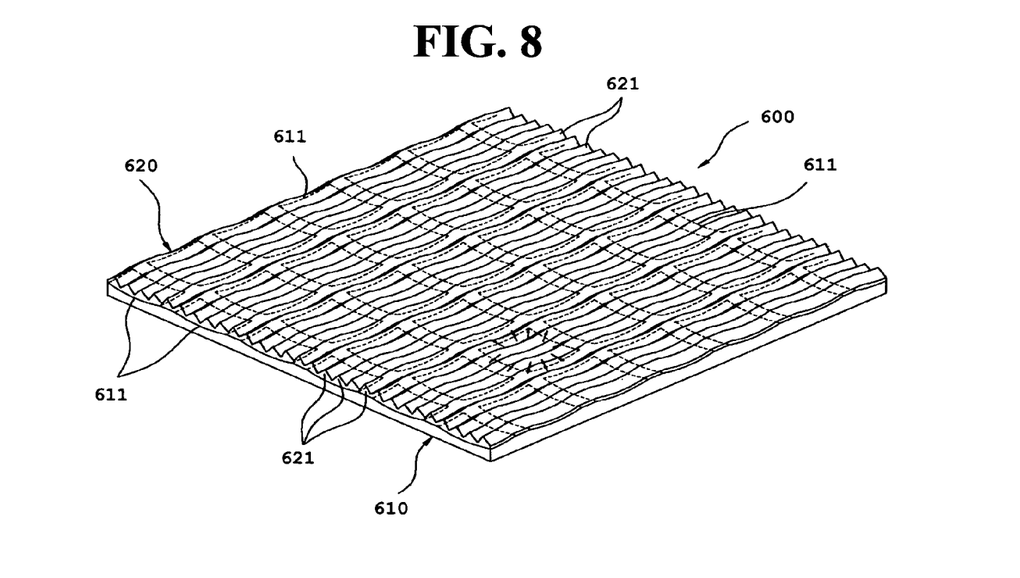
FIG. 8 is a perspective view of an optical film according to a sixth embodiment of the present invention.

FIG. 8 is a perspective view of an optical film according to a sixth embodiment of the present invention. As shown in FIG. 8 the optical film 600 of the sixth embodiment includes a first refraction layer 610 having a plurality of first optical lens patterns 611 for collecting and scattering light, which has been emitted from a light source and a second refraction layer 620 with a plurality of second optical patterns 621 for collecting the light scattered by the first refraction layer 610 and redirecting the collected light vertically to a display panel. As shown in FIG. 8, each of the first optical lens patterns 611 of the first refraction layer 610 has a concave lens with a polygonal shape when viewed in a plan view and is distributed at a predetermined interval as embossments.

Figure 9:
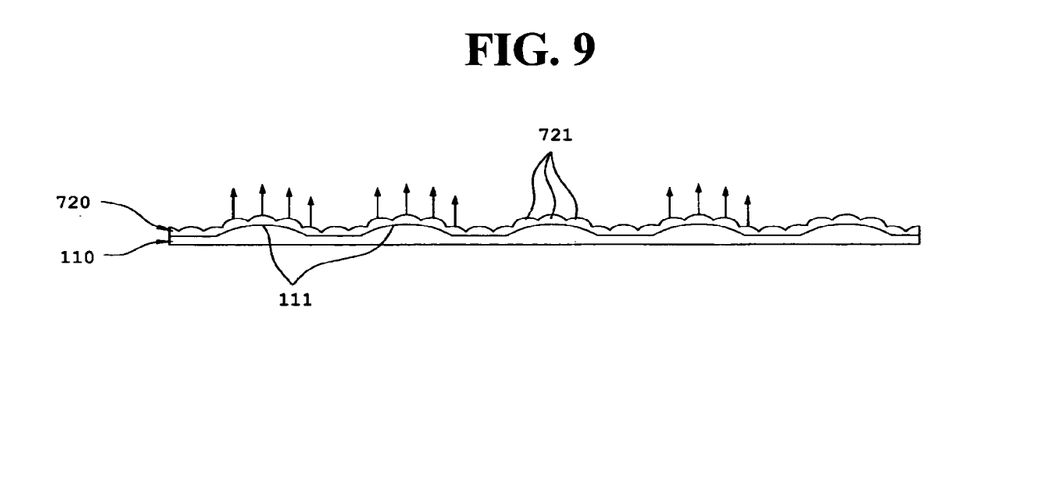
FIG. 9 is a perspective view of an optical film according to a seventh embodiment of the present invention.
Figure 10:
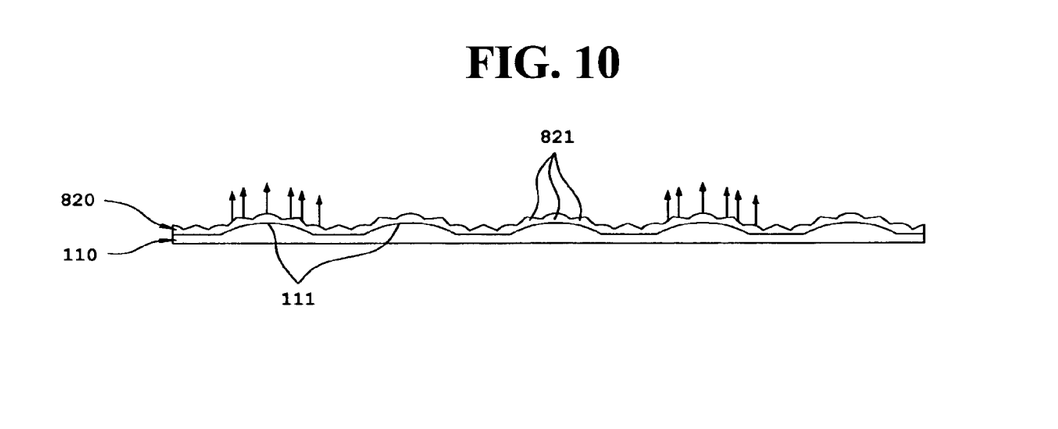
FIG. 10 is a cross-sectional view of an optical film according to an eighth embodiment of the present invention.

FIG. 9 is a cross-sectional view of an optical film according to a seventh embodiment of the present invention. As shown in FIG. 9, each of the second optical patterns 721 of the second refraction layer 720 can be formed to have an arced cross-sectional shapes rather than the triangular cross-sectional shapes. FIG. 10 is a cross-sectional view of an optical film according to an eighth embodiment of the present invention. As shown in FIG. 10, each of the second optical patterns 821 of the second refraction layer 820 can be formed to have a structure including both arced cross-sectional shapes and triangular cross-sectional shapes.

Figure 11:
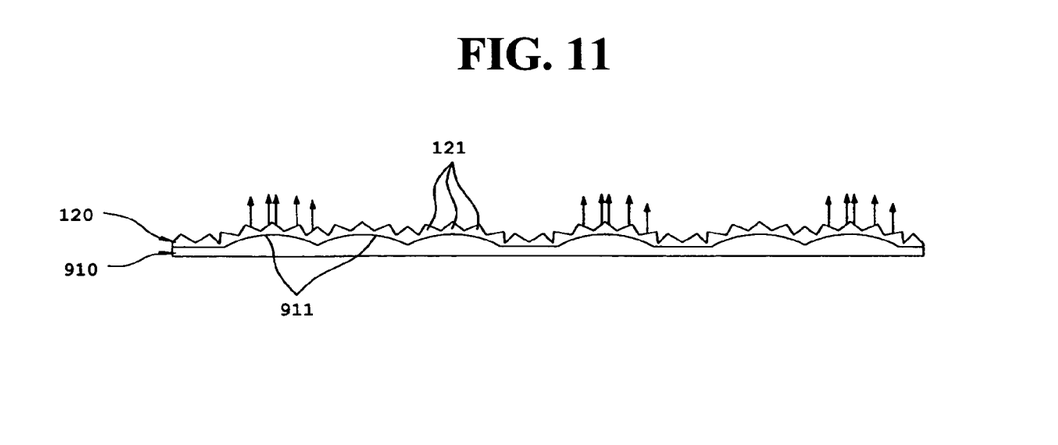
FIG. 11 is a cross-sectional view of an optical film according to a ninth embodiment of the present invention.

FIG. 11 is a cross-sectional view of an optical film according to a ninth embodiment of the present invention. As shown in FIG. 11, the first optical lens patterns 911 of the first refraction layer 920 can be arranged at irregular intervals and the second optical patterns 121 of the second refraction layer 120 can be arranged at a regular interval. In the alternative, both the first optical lens patterns and the second optical patterns can be formed at irregular intervals.

The optical film in embodiments of the present invention increase brightness over the entire area of the display panel in such a manner that the light emitted by the light source is collected by the first optical lens patterns of the first refraction layer and then scatters the light in all directions toward the second refraction layer, and the scattered light is refracted substantially perpendicularly with respect to the rear surface of the first refraction layer so as to be perpendicularly incident on a display panel. Therefore, it is possible to achieve high brightness on the display panel across a wide viewing angle.

Since the second optical patterns are formed along the surface of the first optical lens patterns and thus have the structure corresponding to the peaks and valleys of the first optical lens patterns, optical coupling with other adjacent films is minimized. Accordingly, the wet-out phenomenon can be prevented such that moire does not occur. Further, although the defect of a mote or scratch may occur on the refraction layer, such a defect can not be visually observed due to the light scattered by the first optical lens patterns. Therefore, the productivity is improved due to a reduced percent defective and improved workability.

It will be apparent to those skilled in the art that various modifications and variations can be made in the optical film of the present invention without departing from the spirit or scope of the invention. Thus, it is intended that the present invention cover the modifications and variations of this invention provided they come within the scope of the appended claims and their equivalents.

The invention claimed is:

1. An optical film, comprising:
   a first refraction layer having a first surface with first optical lens patterns for scattering light and a second surface opposite to the first surface, each of the first optical lens patterns having one of a circular shape and elliptical shape in a plan view and a lens shape in a sectional view; and
   a second refraction layer on the first surface and having a third surface with second optical patterns for redirecting light in a first direction that is perpendicular to the second surface of the first refraction layer, the second optical patterns are linear and continuous over the first optical lens patterns in a second direction across the third surface, wherein each of the second optical patterns has one of triangular shape and arced shape when viewed in cross section.

2. The optical film according to claim 1, wherein each of the first optical lens patterns is a convex lens.

3. The optical film according to claim 1, wherein each of the first optical lens patterns is a concave lens.

4. The optical film according to claim 1, wherein each of the second optical patterns has one of a triangular cross-sectional shape and an arced cross-sectional shape.

5. The optical film according to claim 1 wherein the second optical patterns include both triangular cross-sectional shapes and arced cross-sectional shapes.

6. The optical film according to claim 1 wherein the first optical lens patterns are formed at regular intervals.

7. The optical film according to claim 1 wherein the second optical patterns are formed at regular intervals.

8. The optical film according to claim 1, wherein the first and second refraction layers formed of one of polycarbonate, polyvinylchloride, polypropylene, polyethylene and acrylic polymers.

9. A method of manufacturing an optical film, comprising:
   forming a first refraction layer having a first surface with first optical lens patterns for scattering light and a second surface opposite to the first surface, each of the first optical lens patterns having a one of a circular shape and elliptical shape in a plan view and a lens shape in a sectional view; and
   forming a second refraction layer on the first surface and having a third surface with second optical patterns for redirecting light in a first direction that is perpendicular to the second surface of the first refraction layer, the second optical patterns are linear and continuous over the first optical lens patterns in a second direction across the third surface, wherein each of the second optical patterns has one of triangular shape and arced shape when viewed in cross section.

10. The method according to claim 9, wherein each of the first optical lens patterns is a convex lens.

11. The method according to claim 9, wherein each of the first optical lens patterns is a concave lens.

12. The method according to claim 9, wherein each of the second optical patterns has one of a triangular cross-sectional shape and an arced cross-sectional shape.

13. The method according to claim 9, wherein the second optical patterns include both triangular cross-sectional shapes and arced cross-sectional shapes.

14. The method according to claim 9, wherein the first optical lens patterns are formed at regular intervals.

15. The optical film according to claim 9 wherein the second optical patterns are formed at regular intervals.

16. A display device comprising:
 a display panel for displaying an image having a light receiving surface;
 a light source for providing light to the display panel; and
 an optical film positioned between the light source and the display panel, the optical film includes a first refraction layer adjacent to the light source and having first optical lens patterns for scattering light, each of the first optical lens patterns having one of a circular shape and elliptical shape in a plan view and a lens shape in a sectional view, and a second refraction layer on the first surface and having a third surface with second optical patterns for redirecting light in a first direction that is perpendicular to the light receiving surface of the display panel, the second optical patterns are linear and continuous over the first optical lens patterns in a second direction across the third surface, wherein each of the second optical patterns has one of triangular shape and arced shape when viewed in cross section.

* * * * *